United States Patent Office 3,427,229
Patented Feb. 11, 1969

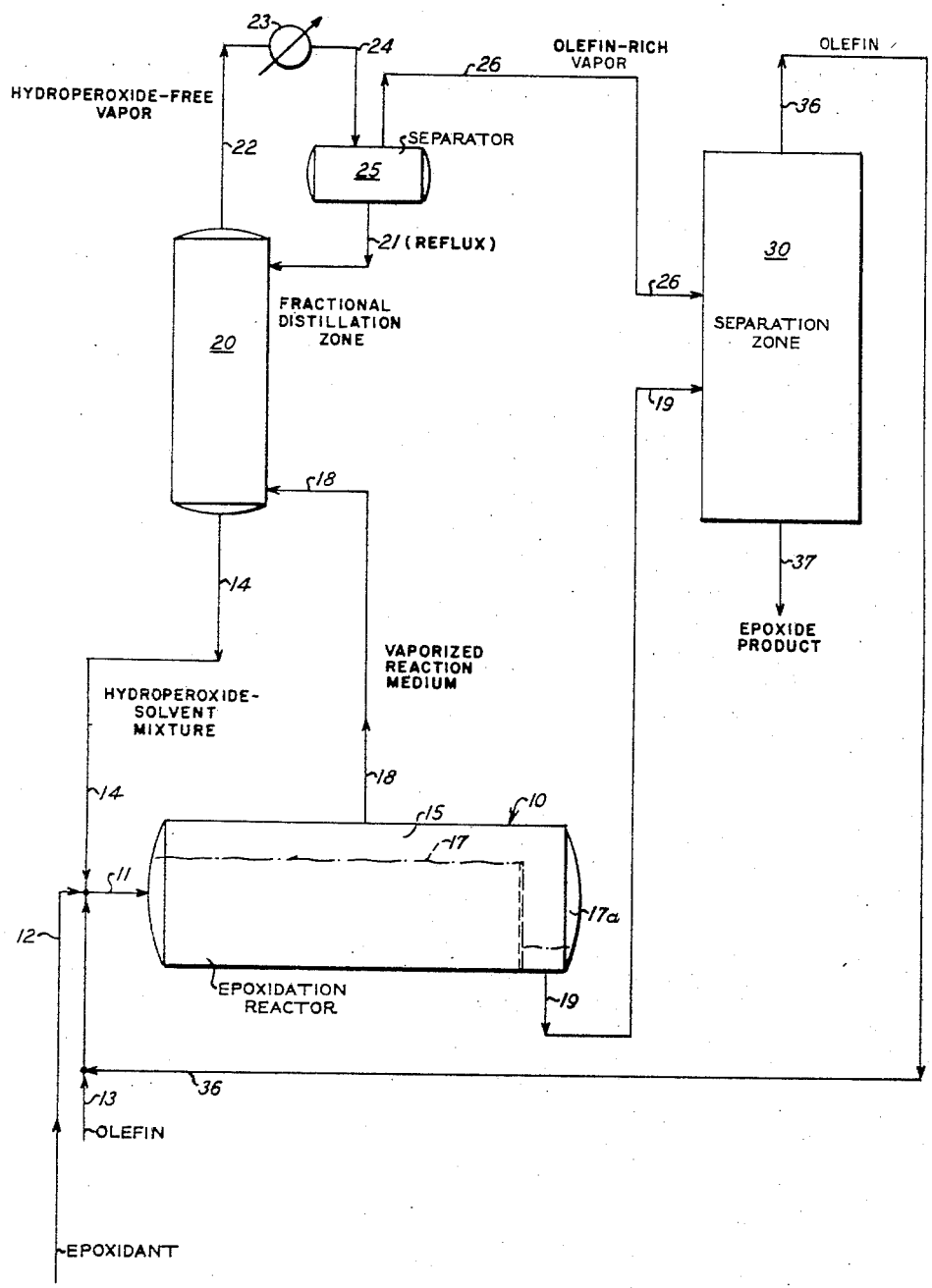

3,427,229
RECOVERY OF TERTIARY-BUTYL HYDROPEROXIDE BY FRACTIONATION IN THE PRESENCE OF A REFLUXING AGENT
Stanley Herzog, Cliffside Park, N.J., assignor to Halcon International, Inc., a corporation of Delaware
Filed May 22, 1967, Ser. No. 640,003
U.S. Cl. 203—63                        5 Claims
Int. Cl. B01d 3/40

ABSTRACT OF THE DISCLOSURE

This invention is directed to the recovery of tertiary-butyl hydroperoxide that has escaped into the vapor phase from a liquid phase epoxidation reaction, said vapor phase containing an olefin and a tertiary-butyl alcohol, by distilling a vapor stream of the reaction product in a fractionation zone and contacting the stream with a refluxing agent within the fractionation zone in such a manner as to recover an overhead stream essentially free of tertiary-butyl hydroperoxide and recovering, as a bottoms stream, a dilute solution of the hydroperoxide in a predominant amount of the refluxing agent. The bottoms stream is returned to the epoxidation reaction zone.

BACKGROUND

In recently issued Belgian Patents, Nos. 663,859, 665,082 and 644,090, there is disclosed a process for the epoxidation of olefins in the presence of catalytically effective amounts of metals. The process disclosed in these Belgian patents is capable of producing epoxides from the olefinic starting materials in high yields, i.e., with only small amounts of undesired side products. The catalysts are one or more metals selected from the group consisting of titanium, vanadium, chromium, columbium, selenium, zirconium, niobium, molybdenum, tellurium, tantalum, tungsten, rhenium and uranium. Of the foregoing, vanadium, tungsten, molybdenum, titanium and selenium are the preferred species.

As disclosed in the hereinabove cited Belgian patents, during the epoxidation reaction the olefin is epoxidized to form the corresponding oxirane derivative and the organic hydroperoxide is converted to the corresponding alcohol. Desirable reaction conditions include a reaction temperature between about 0° C. and about 200° C., a reaction pressure sufficient to maintain a liquid phase, a molar ratio of olefin to organic hydroperoxide in the reaction between about 1:1 and about 20:1, and reaction times normally between about ten minutes and about ten hours.

As disclosed and claimed in copending application, Ser. No. 606,192, filed Dec. 30, 1966, it has been discovered that significant yield advantages are obtained by conducting the hereinabove described epoxidation reaction under autogenous pressure wherein by a portion of the liquid phase reaction medium is volatilized. In a preferred embodiment, this volatilized reaction medium is withdrawn from the reactor as a vapor and processed to recover product epoxide and other materials contained therein.

Obtention of the yield advantages just referred to presents relatively few problems in many instances; however, in other instances wherein the organic hydroperoxide (the epoxidizing agent) has an appreciable partial pressure at reaction conditions, the volatilized reaction medium can contain significant amounts of vaporized and/or entrained hydroperoxide. For several reasons this is undesirable. Firstly, hydroperoxides are relatively unstable and can decompose to yield products other than those desired when outside of the environment of the reactor. This results in a loss in yield and this loss can be a significant one. Uncontrolled hydroperoxide decomposition outside of the environment of the reactor, particularly at points in product recovery equipment where hydroperoxides tend to concentrate, also may present safety problems.

SUMMARY OF THE INVENTION

Accordingly, it is highly desirable when organic hydroperoxides are employed as epoxidants and have appreciable partial pressures under conditions such that they are a significant component of the vapor streams, and that the hydroperoxide be removed quickly from such vapor streams. It is to such a removal process that my invention relates.

Naturally, it is very desirable that the hydroperoxide be recovered as such, i.e., that it be recovered without decomposition. This is also readily accomplished by means of the process of this invention.

In accordance with this invention, I have discovered that such removal and recovery can be accomplished by introducing the hydroperoxide containing vapor to the lower portion of a fractionating zone wherein the vapor is countercurrently contacted with a refluxing agent, the refluxing agent being introduced to an upper portion of the fractionating zone. In this manner, the organic hydroperoxide is recovered as a liquid in admixture with the refluxing agent. This liquid admixture is withdrawn from the bottom of the fractionating zone and, in a preferred embodiment, is returned to the epoxidation reactor whence the hydroperoxide is derived. Product, substantially hydroperoxide-free vapor, is withdrawn from the overhead, i.e., top of the fractionating zone and can be processed in any desired manner to recover the constituents thereof.

In a particularly preferred embodiment of the process of this invention, the liquid refluxing agent is obtained by partial condensation of the overhead vapor, the degree of such condensation being sufficient to provide the necessary reflux. The vapor remaining after such partial condensation is then the overhead product from the system.

DETAILED DESCRIPTION OF THE INVENTION

To place this invention in its proper context, the overall epoxidation reaction will also be described and the interrelations between the epoxidation reaction and the process of this invention will be pointed out.

The olefinically unsaturated materials which can be epoxidized inside substituted and unsubstituted aliphatic and alicyclic olefin hydrocarbons having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinyl-cyclohexene, the phenyl cyclohexenes, and the like. Olefins having halogen, oxygen, sulfur and the like substituents, including ester and ether linkages, can be used. Such substituted olefins are illustrated by allyl alcohol, methallyl alcohol, diallyl ether, methyl methacrylate, methyl oleate, methyl vinyl ketone, allyl chloride, and the like.

Particularly preferred olefins are propylene, n-butene-1, styrene, and butadiene. For epoxidation of these preferred olefins, preferred catalysts include molybdenum, titanium, vanadium and tungsten.

Suitable organic hydroperoxides have the formula ROOH, wherein R is an organic radical, preferably a substituted or unsubstituted alkyl, cycloalkyl, aralkyl, aralkenyl, hydroxyaralkyl, cycloalkenyl or hydroxycycloalkyl radical said organic radical having from 3–20 carbon atoms. R may also be a heterocyclic radical.

Illustrative and preferred hydroperoxides are cumene hydroperoxide, ethylbenzene hydroperoxide, tertiary-butyl hydroperoxide, cyclohexanone peroxide, tetralin hydroperoxide, methyl ethyl ketone peroxide, methylcyclohexene hydroperoxide, and the like, as well as the hydroperoxides of toluene, p-ethyl toluene, isobutyl-benzene, diisopropyl benzene, p-isopropyl toluene, o-xylene, m-xylene, p-xylene, phenyl cyclohexane, etc. Particularly preferred organic hydroperoxides are ethylbenzene hydroperoxide (alpha-phenylethylhydroperoxide) tertiary-butyl hydroperoxide, and cyclohexanone peroxide.

Epoxidation reaction temperatures between about 0° C. and about 200° C. can be employed. Reaction temperatures between about 90° C. and about 200° C. are desired and reaction temperatures between about 90° C. and about 150° C. are preferred. As disclosed and claimed in copending application, Ser. No. 606,192, the epoxidation reaction is conducted under autogenous pressure and the reactor conditions are chosen to maintain a liquid phase reaction medium, as the epoxidation is a liquid phase reaction. Thus, the liquid phase reaction medium within the reactor is a boiling liquid. The actual reaction pressure, consequently, will be a function of the nature of the solvent, the nature of the organic hydroperoxide, and the nature of the olefin being epoxidized. In general, the autogenous pressures of the systems employed, i.e., reaction pressures, will be between about atmospheric pressure and about 900 p.s.i.a. In a typical preferred embodiment, wherein propylene oxide is formed by the epoxidation of propylene employing tertiary-butyl hydroperoxide as the epoxidant, reaction pressures between about 400 p.s.i.a. and about 900 p.s.i.a. will be encountered, depending upon the concentration of propylene in the reaction medium and upon the reaction temperature selected. Inerts, e.g., ethane, propane or the like if present in the reactor can also affect reaction pressure.

When the volatilized reaction medium is withdrawn as a vapor, the reaction temperature and reactor feed composition are desirably such as to permit about one-quarter or more of the epoxide product to be volatilized and preferably are such as to permit one-third or more of such epoxide product to be volatilized. This can readily be accomplished within the temperature ranges specified above. The feed to the epoxidation reactor in this preferred mode of operation comprises from about 10 to about 90 mol percent of olefin, from about 1 to about 60 mol percent of hydroperoxide, the balance of the feed being primarily solvent. Small amounts of other materials can also be present in the epoxidation reactor feed.

On occasion, in the preferred embodiment of the invention of copending application, Ser. No. 606,192, wherein a portion of the vaporized reaction medium is withdrawn from the reactor as a vapor, amounts of hydroperoxide, significant in terms of yield, can be present in the withdrawn vapor stream, either because of entrainment or because of an appreciable partial pressure at reaction conditions or both. By "significant" as herein used, I mean present in amounts such that the concentration is about 0.05 mol percent or more. When the concentration of hydroperoxide in this vapor stream is less than about 0.05 mol percent, the process of this invention is not normally required, though it can still be employed when even this small a loss is undesirable. Examples of hydroperoxides which, when used as epoxidants, are likely to be present in this vapor stream in amounts sufficient to warrant the use of the process of this invention include tertiary-butyl hydroperoxide and methyl ethyl ketone peroxide.

The epoxidation reaction is desirably carried out in the presence of a solvent. Suitable solvents are the aliphatic, naphthenic or aromatic hydrocarbons or their oxygenated derivatives. Hydroxyl substituted hydrocarbons, i.e., alcohols, are particularly suitable. Preferably, the solvent has the same carbon skeleton as the hydroperoxide used, so as to minimize or avoid solvent separation problems during product recovery. Solvent mixtures may also be employed and, indeed, commonly are employed. Thus, for example, when ethylbenzene hydroperoxide is the epoxidizing agent employed, a particularly preferred solvent would comprise a mixture of ethylbenzene and alpha-phenylethanol. When tertiary-butyl hydroperoxide is the epoxidizing agent, a particularly suitable solvent comprises tertiary butanol and may also contain butanes.

The refluxing agent employed in the process of this invention can comprise in large part any of the materials suitable for use as epoxidation reaction solvents, and desirably, though not essentially, comprises in large part the same material which is employed as the epoxidation solvent to simplify product recovery. In the preferred embodiment wherein the refluxing agent is obtained by partial condensation of the overhead vapor, this is inherent and the refluxing agent consists essentially of the epoxidation sovent, the olefin being epoxidized, the alcohol formed as the result of the reaction of the hydroperoxide with the olefin (which can be and often is identical with the solvent) and the epoxide product, and also may contain hydroperoxide. In other embodiments wherein the refluxing agent is a separate stream, i.e., is obtained by other means, it is preferred to employ as refluxing agents materials identical to the epoxidation reaction solvent, e.g., ethylbenzene when this is the epoxidation solvent or t-butanol when this is the epoxidation solvent. Of course, mixtures such as, for example, a mixture of alpha-phenylethanol and ethylbenzene can also be used.

The material fed to the fractionation zone in the process of this invention accordingly comprises a portion of the epoxide product, a substantial amount of unreacted olefin, a portion of the solvent employed in the course of the reaction, a portion of the alcohol formed as a result of the utilization of the organic hydroperoxide employed in the reaction (which may be identical with the solvent) and some organic hydroperoxide. The overhead product from the fractionation zone advantageously contains less than 10% of the hydroperoxide contained in the feed, i.e., 90% or more of the hydroperoxide is removed from the entering vapor. Greater or lesser hydroperoxide removals are of course feasible since, in the final analysis, hydroperoxide removal is governed by economic as well as by process considerations. This overhead product vapor can then be further processed to recover unreacted olefin which is advantageously recycled to the epoxidation and also to recover volatilized epoxide product. This separation can be readily accomplished in known manner as, for example, by conventional distillation and/or absorption techniques.

The fractionating zone is provided with a plurality of vapor-liquid contacting devices equivalent to between 2 and 20 theoretical contacting plates. It is preferably operated at a temperature between about 50° C. and about 180° C. and at a pressure less than that of the epoxidation reactor unless compression facilities are provided, in which case any suitable fractionating zone pressure can be used. Suitable pressures are between about atmospheric and about 900 p.s.i.a. (preferably 175 p.s.i.a. to 800 p.s.i.a. when propylene is the olefin being epoxidized though it can be operated at substantially lower pressures, in which case refrigeration and/or compression may be required in order to be able to conveniently process the overhead vapor product therefrom in subsequent equipment). Suitable reflux ratios (i.e., mols of reflux per mol of overhead vapors product) between about 0.05:1 and about 2:1, and preferably between about 0.1:1 and about 0.3:1 can be used. As will be obvious to those skilled in the art, higher numbers of theoretical trays and/or higher reflux ratios can be employed in the design of a suitable unit though they are not required. Moreover, number of contacting stages, reflux ratios, operating temperatures and pressures are usually adjusted within the ranges given hereinabove to achieve an economic optimum design for a specific plant in a manner known to those skilled in the art. Obviously, the vapor stream as well as the refluxing agent each can be introduced to the fractionating zone at several points rather than at a single point.

DESCRIPTION OF THE DRAWING

The process of this invention will be more fully explained in conjunction with the attached drawing which is a schematic representation of one embodiment thereof. For purposes of illustration, but without intending any limitation upon the scope of this invention, the feed to the epoxidation is assumed to be propylene which is converted to propylene oxide employing tertiary-butyl hydroperoxide as the epoxidant. The reaction solvent is assumed to be tertiary-butyl alcohol. The fractionation zone is assumed to be refluxed by partial condensation of the overhead therefrom.

Referring to the accompanying drawing, there is provided an epoxidation reactor 10, having inlet conduit 11. Organic hydroperoxide, suitably tertiary-butyl hydroperoxide and catalyst, suitably comprising molybdenum, e.g., in the form of the naphthenate, are supplied to reactor 10 through conduit 12 which communicates with conduit 11 and thence to reactor 10. A suitable solvent for the reaction, e.g., tertiary butanol, is also supplied to the reactor via conduit 12. Fresh propylene is supplied to reactor 10 via conduit 13, communicating with conduit 11. Recycle propylene, obtained in a manner to be subsequently described, is supplied via conduit 36 communicating with conduit 13. An additional recycle stream, comprising solvent and hydroperoxide obtained in a manner hereinafter described, is fed to reactor 10 via conduit 14, which also communicates with conduit 11.

Reactor 10 can be of the tubular type or of the drum type. Desirably, the reactor is provided with means for positively preventing undesirable back-mixing of reaction products with the entering reactants.

Disposed within reactor 10 is a liquid phase reaction medium 17 comprising solvent, unreacted hydroperoxide, unreacted olefin, epoxide product, and organic alcohol formed during the reaction of the hydroperoxide with the olefin. (In many instances the organic alcohol formed by the reaction of the hydroperoxide with the olefin is identical with the solvent.) Also within reactor 10 is a vapor space 15. Liquid level within the reactor is maintained to prevent vapor space 15 from filling with liquid, for example, by provision of weir 16.

The liquid phase reaction medium is maintained under its autogenous pressure and therefore is partially vaporized as the reaction proceeds, i.e., the reaction medium is boiling. The heat requirements for this vaporization are supplied by the heat of reaction. This vaporized portion of the reaction medium in the embodiment depicted in the drawing is withdrawn from reaction 10 via conduit 18 and, in accordance with this invention, is fed to fractionation zone 20.

In the operation of reactor 10 the reactants enter and accumulate within the reactor until the level of the liquid phase reaction medium reactor 10 exceeds the height of internal baffle (or weir) 16. The liquid phase reaction medium then overflows baffle 16 and flows into compartment 17a and is withdrawn from reactor 10 via conduit 19. The liquid reactor effluent is then fed via conduit 19 to separation zone 30. In fractionation zone 20 the vaporized portion of the reaction medium which is withdrawn from reactor 10 via conduit 18 is countercurrently contacted with a refluxing agent so as to recover vaporized and entrained organic hydroperoxide.

The vaporized reaction medium flows up through fractionation zone 20 and is contacted therein with downflowing liquid refluxing agent. The refluxing agent is introduced to scrubber 20 via conduit 21. The overhead vapor is withdrawn from scrubber 20 via conduit 22, and is partially condensed in heat exchanger 23. The effluent from exchanger 23 flows through conduit 24 to vapor-liquid separator 25. The net overhead product is the non-condensed portion of the overhead from scrubber 20 and is withdrawn from vapor-liquid separator 25 through conduit 26, whence it is fed to separation unit 30. The liquid condensed in heat exchanger 23 is withdrawn from vapor-liquid separator 25 through conduit 21 and is returned as reflux to scrubber 20. The bottoms product from scrubber 20, comprising organic hydroperoxide and reaction solvent, is withdrawn from scrubber 20 via conduit 14 and is recycled to epoxidation reactor 10.

Though the scrubber is preferably refluxed by partial condensation of the scrubber overhead as shown in the drawing, this is not essential. Reflux can also be provided by employment of a suitable external stream, such stream comprising, e.g., tertiary butanol or other material compatible with the epoxidation reaction, i.e., materials which are suitable epoxidation reaction solvents can be employed to reflux the column.

In separation unit 30 the net overhead vapor product from scrubber 20 and the liquid phase epoxidation reactor effluent, which is drawn from reactor 10 via conduit 19 are processed to recover unreacted propylene and a mixture comprising the propylene oxide product, tertiary-butyl alcohol solvent and tertiary-butyl alcohol formed as the result of the reaction of tertiary-butyl hydroperoxide with propylene. Separation unit 30 is preferably designed and operated to maintain the bottoms temperatures therein at sufficiently low levels to minimize decomposition of propylene oxide, i.e., below 140° C. and preferably at or below 120° C. The propylene so recovered is withdrawn from separation unit 30 via conduit 36 and is recycled to the epoxidation reaction. The product mixture is withdrawn from separation unit 30 via conduit 37. Facilities can be provided within separation unit 30 for separating and purging inerts from the system to prevent their build-up.

Accordingly, separation unit 30 functions as a depropanizer. Since the design of such equipment is conventional and since the design and operation of such equipment is known to those skilled in the art, the equipment associated with separation unit 30 is not shown in the attached drawing.

Separation unit 30 can often consist of two or more columns connected in series together with the associated heat exchangers pumps and the like. In such a system, the pressure in the first of the columns is sufficiently high to permit condensation of the overhead propylene with cooling water while the bottoms also contains sufficient propylene (plus, of course, propylene oxide and tertiary-butyl alcohol) to allow the bottoms temperature to remain within the hereinabove described limits. Such a column typically contains 12 theoretical vapor-liquid contacting stages and operates with a reflux ratio (mols of net liquid overhead product per mol of reflux) of 0.8:1. Suitable overhead temperatures and pressures are respectively 55° C. and 335 p.s.i.a. while the suitable bottoms temperatures and pressures are respectively 118° C. and 340 p.s.i.a.

The second column desirably operates at a lower pressure and is used to remove the balance of the propylene from the propylene oxide-tertiary-butyl alcohol solvent. Suitable operating characteristics for this second column would include an overhead temperature and pressure of respectively −9.5° C. and 67 p.s.i.a. and a bottoms temperature and pressure respectively of 118° C. and 72 p.s.i.a. Such a column suitably contains 18 theoretical vapor-liquid contacting stages and operates with 0.6 mol of liquid reflux per mol of feed entering the column. Because of the low overhead temperature, the second column requires vapor compression and/or refrigeration facilities to permit condensation of propylene. The bottoms from the second column in such a system is an essentially propylene-free mixture comprising propylene oxide and tertiary-butyl alcohol.

EXAMPLE

The following example is presented to further illustrate this invention but is not intended as limiting the scope thereof. Unless otherwise stated, all parts and percents in this example are expressed on a molar basis.

Example I

A continuous epoxidation experiment is conducted in apparatus similar to that schematically depicted in FIGURE I. Insofar as is necessary for an understanding of the invention, details of the apparatus will be described in conjunction with the following description of the epoxidation.

Tertiary-butyl hydroperoxide plus tertiary-butyl solvent are fed to a reaction vessel at the rate of 16.94 parts/hr. Also present in this stream is molybdenum catalyst sufficient to provide 200 p.p.m. (by weight) of molybdenum in the total reactor feed (excluding recycled hydroperoxide and recycled alcohol solvent). Composition of this stream is given in the first column of Table I. Also fed to this reactor are 99.54 parts/hr. of propylene, of which 5.36 parts/hr. are fresh propylene and 94.18 parts/hr. are recycled propylene. For the sake of completeness in Table I, these stream compositions are included in the second and third columns thereof.

The reactor in which the epoxidation reaction occurs is so sized that the total residence time of the liquid phase reaction medium within the reactor is about 20 minutes. Vapor space is also provided within the reactor.

The epoxidation reactor is maintained at a temperature of 125° C. and is maintained under autogenous pressure of the system—in this case 720 p.s.i.a.

During the course of the reaction 92.00 parts/hr. of the liquid phase reaction medium are vaporized and are withdrawn from the reactor as a vapor. The composition of this vapor is given in the fourth column of Table I. Also, 29.10 parts/hr. of liquid phase reaction medium having the composition set forth in the fifth column of Table I are withdrawn from the last compartment of the reactor.

In accordance with this invention, the vapors withdrawn from the reactor during the reaction are processed in a fractionation column in the manner depicted in FIGURE I in order to recover the hydroperoxide contained in the vapor. The column is equipped with a plurality of type contacting devices equivalent to five theoretical contacting stages. The column overhead temperature and pressure are respcetively 122° C. and 710 p.s.i.a. The reflux ratio which the column is operated is 0.20:1 expressed as mols of liquid reflux returned to the column per mol of net overhead vapor product. The overhead from the column is partially condensed to a temperature of 109° C. The liquid obtained by this partial condensation is returned to the column as reflux and has the composition given in the sixth column of Table I. The uncondensed portion of the column overhead, 87.35 parts/hr. is the net overhead vapor product from the scrubber and has the composition set forth in the seventh column of Table I. The bottoms from the column, containing the bulk of the hydroperoxide vaporized during the epoxidation reaction and having the composition set forth in the eighth column of Table I is recycled to the epoxidation reactor. This recycle stream amounts to 4.65 parts/hr.

The net overhead vapor product from the column is then processed to recover unreacted propylene for recycle and propylene oxide in admixture with tertiary-butyl alcohol as the product. This is accomplished in conventional distillation equipment. Also processed in this distillation equipment is the liquid phase reaction medium withdrawn from the reactor as hereinabove described. The recycle propylene amounts to 94.18 parts/hr. and has the composition set forth in the ninth column of Table I. The bottoms product from this distillation amounts to 22.27 parts/hr. and has the composition listed in the tenth column of Table I. During this distillation, the bottoms temperature is controlled so that it does not exceed about 115° C. The bottoms product from this distillation can then be processed in known manner so as to recover propylene oxide in high purity in subsequent equipment, e.g., distillation equipment, in known manner.

It will be noted that about 90% of the hydroperoxide in the feed to the fractionation zone is recovered therein, significantly improving both process economics and process safety.

The foregoing description illustrates the methods of this invention whereby the advantages thereof are obtained. It will be understood that modifications and variations thereof may be effected by those skilled in the art without departing from the spirit of my invention. Accordingly, it is intended that all matter contained in the above description shall be interpreted as illustrative and not in a limiting sense.

TABLE I.—STREAM COMPOSITIONS FOR EXAMPLE I
[Mol percent]

| Component | (1) Expoxidant Solvent [a] | (2) Fresh Olefin [b] | (3) Recycle Olefin [b] | (4) Withdrawn Vapor | (5) Liquid Effluent | (6) Scrubber Reflux | (7) Scrubber Overhead Product | (8) Scrubber Bottoms | (9) Recycle Propylene [b] | (10) Product mixture |
|---|---|---|---|---|---|---|---|---|---|---|
| Propylene | | 100.0 | 100.0 | 87.09 | 52.52 | 67.34 | 90.34 | 26.25 | 100.0 | |
| Propylene Oxide | | | | 3.34 | 7.08 | 5.81 | 3.17 | 6.61 | | 21.60 |
| Tertiary Butyl Alcohol | 60.7 | | | 9.33 | 34.00 | 26.70 | 6.47 | 62.89 | | 69.92 |
| Tertiary Butyl Hydroperoxide | 39.3 | | | 0.24 | 4.56 | .15 | 0.02 | 4.25 | | 6.06 |
| Heavies [c] | | | | | 1.84 | | | | | 2.42 |
| | 100.00 | 100.00 | 100.00 | 100.00 | 100.00 | 100.00 | 100.00 | 100.00 | 100.00 | 100.00 |

[a] Excludes catalyst added to this stream.   [b] Excludes inerts, e.g., propane, ethane, nitrogen, carbon dioxide, etc.   [c] High-boiling reaction byproducts.

What is claimed is:

1. A process for recovering tertiary-butyl hydroperoxide from a vapor stream comprising tertiary-butyl hydroperoxide, an olefin, and tertiary-butyl alcohol, said vapor stream having been generated in a liquid phase epoxidation reaction in the presence of one or more metals selected from the group consisting of titanium, vanadium, chromium, columbium, selenium, zirconium, molybdenum, tellurium, tantalum, tungsten, rhenium, and uranium, between said olefin and, as the epoxidant, tertiary-butyl hydroperoxide, said process for recovering hydroperoxide comprising the steps of:

(a) Introducing said vapor stream to a lower portion of a fractionating zone;
  (b) Introducing a liquid refluxing agent to an upper portion of said fractionating zone, said refluxing agent comprising an organic compound which is nonreactive in said liquid phase epoxidation reaction;
  (c) Countercurrently contacting the vapor stream with the liquid refluxing agent within the fractionating zone;
  (d) Withdrawing an overhead vapor essentially free of tertiary-butyl hydroperoxide;
  (e) Withdrawing a bottoms liquid stream in the form of a dilute solution of hydroperoxide and a predominant amount of the refluxing agent; and, (f) Returning said bottoms liquid stream to the epoxidation reaction.

2. A process in accordance with claim 1 wherein the fractionating zone contains from 2 to 20 theoretical vapor-liquid contacting stages and operates at a reflux ratio between about 0.05:1 and about 2:1.

3. A process in accordance with claim 2 wherein said fractionating zone operates at a pressure between about atmospheric and about 900 p.s.i.a. and at a temperature between about 50 and about 180° C.

4. A process in accordance with claim 1 wherein said liquid refluxing agent is obtained by:
(a) partial condensation of the overhead vapor to form a tertiary-butyl alcohol-containing liquid condensate and a residual vapor;
(b) separating the liquid condensate from the residual vapor; and,
(c) employing the alcohol-containing liquid condensate as the liquid refluxing agent.

5. A process in accordance with claim 3 wherein propylene is the olefin and wherein the fractionating zone operates at a pressure between about 175 p.s.i.a. and about 800 p.s.i.a.

References Cited

UNITED STATES PATENTS

| | | | |
|---|---|---|---|
| 2,754,325 | 7/1956 | Smith | 260—348.5 |
| 2,776,301 | 1/1957 | Payne et al. | 260—348.5 |
| 2,832,802 | 4/1958 | Kohn | 203—87 |
| 3,092,557 | 6/1963 | Ester et al. | 203—52 |
| 3,337,425 | 8/1967 | Binning et al. | 203—52 |
| 3,350,420 | 10/1967 | Fariss | 203—87 |

WILBUR L. BASCOMB, JR., *Primary Examiner.*

U.S. Cl. X.R.

203—65, 69, 87, 77, 81, 75, 82, 94; 260—348.5, 348